(12) United States Patent
Yamasaki

(10) Patent No.: US 9,397,586 B2
(45) Date of Patent: Jul. 19, 2016

(54) ULTRASONIC WAVE MOTOR AND ULTRASONIC WAVE MOTOR-EQUIPPED DEVICE

(71) Applicant: CANON KABUSHIKI KAISHA, Tokyo (JP)

(72) Inventor: Ryo Yamasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 20 days.

(21) Appl. No.: 14/594,986

(22) Filed: Jan. 12, 2015

(65) Prior Publication Data

US 2015/0200610 A1 Jul. 16, 2015

(30) Foreign Application Priority Data

Jan. 15, 2014 (JP) .................. 2014-005153

(51) Int. Cl.
G02B 7/02 (2006.01)
H02N 2/00 (2006.01)
H02N 2/02 (2006.01)
G02B 7/09 (2006.01)

(52) U.S. Cl.
CPC .................. *H02N 2/026* (2013.01); *G02B 7/09* (2013.01); *H02N 2/001* (2013.01)

(58) Field of Classification Search
CPC ...... G02B 7/02; G02B 7/023; G02B 7/70825; G02B 7/04; H02N 2/02; H02N 2/026; H02N 2/04

USPC ............. 359/811, 819, 822–824; 310/323.02, 310/323.03, 323.06

See application file for complete search history.

(56) References Cited

U.S. PATENT DOCUMENTS

2014/0293463 A1* 10/2014 Yamanaka ............. H02N 2/026 359/824

FOREIGN PATENT DOCUMENTS

JP 2011-227122 A 11/2011

* cited by examiner

*Primary Examiner* — William Choi
(74) *Attorney, Agent, or Firm* — Canon USA, Inc., IP Division

(57) ABSTRACT

A driving device having a vibration element, a friction member, and a pressing member for applying pressure in a direction in which the vibration element and the friction member make contact with each other, causing the vibration element and the friction member to make a relative movement by vibration generated in the vibration element. The device includes a connection member configured to transmit a driving force caused by the relative movement to a holding member of another member, wherein the holding member makes a movement caused by the transmitted driving force, and a guide member configured to guide the holding member in a moving direction when the vibration element and the friction member make the relative movement. The connection member connects the holding member to the vibration element or the friction member so as not to apply a reaction force caused by the pressing member to the holding member.

25 Claims, 4 Drawing Sheets

ULTRASONIC WAVE MOTOR AND ULTRASONIC WAVE MOTOR-EQUIPPED DEVICE

BACKGROUND OF THE INVENTION

1. Field of the Invention

The present invention relates to an ultrasonic wave motor used for driving a focus mechanism and a zoom mechanism of a lens barrel device, a printer, and a sheet feeding device, an ultrasonic wave motor-equipped device such as the lens barrel device, and a lens holding device.

2. Description of the Related Art

Conventionally, for example, an ultrasonic wave motor has been employed as a driving source of a lens of a camera by taking advantage of its characteristics such as silent operability, low-to-high driving speed capability, and high torque output. A driving device discussed in Japanese Patent Application Laid-Open No. 2011-227122 includes an ultrasonic wave motor configured of a lens holding member for holding a lens, a friction member positioned on the outer side in a radial direction of the lens which is capable of moving in an optical axis direction together with the lens holding member, and a vibration element for driving the friction member. This ultrasonic wave motor includes a roller disposed on a position facing the vibration element with the friction member therebetween, so as to make contact with the friction member. The roller functions as a guide mechanism for making the friction member rectilinearly move in the optical axis direction.

On the other hand, the lens holding member is configured integrally with the friction member so as to be held by two guide members provided on a lens barrel main unit. These guide members serve as a guide mechanism for making the lens holding member rectilinearly move in the optical axis direction. With the above-described configuration, the vibration element is held while being pressed by the friction member. When an ultrasonic wave vibration is excited in the vibration element in such a pressurized state, elliptic motion occurs in a contact portion of the vibration element corresponding to the friction member, so that the lens holding member configured integrally with the friction member makes a rectilinear movement.

However, the driving device discussed in Japanese Patent Application Laid-Open No. 2011-227122 includes rectilinear guide mechanisms for the friction member and the lens holding member, respectively, and thus the driving device is complexly configured of a large number of components at high cost. Further, because the lens holding member is integrally disposed on an ultrasonic wave motor unit that includes the friction member, the lens holding member is multiply fixed by a screw portion of the ultrasonic wave motor unit and the two guide members when the driving device is assembled into a finished state. Therefore, it is hard to say that the lens holding member can move smoothly.

SUMMARY OF THE INVENTION

The present invention is directed to an ultrasonic wave motor, an ultrasonic wave motor-equipped device such as a lens barrel device, and a lens holding device capable of stably moving a holding member such as a lens holding member by employing relatively small number of components.

According to an aspect of the present invention, there is provided a driving device having a vibration element, a friction member, and a pressing member for applying pressure in a direction in which the vibration element and the friction member make contact with each other, causing the vibration element and the friction member to make a relative movement by vibration generated in the vibration element. The driving device includes a connection member configured to transmit a driving force caused by the relative movement to a holding member of another member, wherein the holding member makes a movement caused by the transmitted driving force, and a guide member configured to guide the holding member in a moving direction when the vibration element and the friction member make the relative movement. The connection member connects the holding member to the vibration element or the friction member so as not to apply a reaction force caused by the pressing member to the holding member.

Further features of the present invention will become apparent from the following description of exemplary embodiments with reference to the attached drawings.

DESCRIPTION OF THE EMBODIMENTS

In an ultrasonic wave motor or an ultrasonic wave motor-equipped device according to an exemplary embodiment of the present invention, when a vibration element and a friction member of the ultrasonic wave motor relatively move rectilinearly, a guide member for a holding member provided for another member is used as a rectilinear guide mechanism. Then, a connection member connects the vibration element or the friction member with the holding member so as not to transmit a reaction force caused by a pressing member to the holding member. Further, a lens holding device according to the present exemplary embodiment includes a guide member held by a lens holding member which is used as a rectilinear guide mechanism of the lens holding member, and a movable frame for holding the vibration element and the pressing member which holds the guide member separately from the lens holding member. For example, because the movable frame, which holds the vibration element and the pressing member via a below-described thin plate holding member, holds the guide member separately from the lens holding member, the reaction force caused by the pressing member is not applied to the lens holding member.

Figure 1:
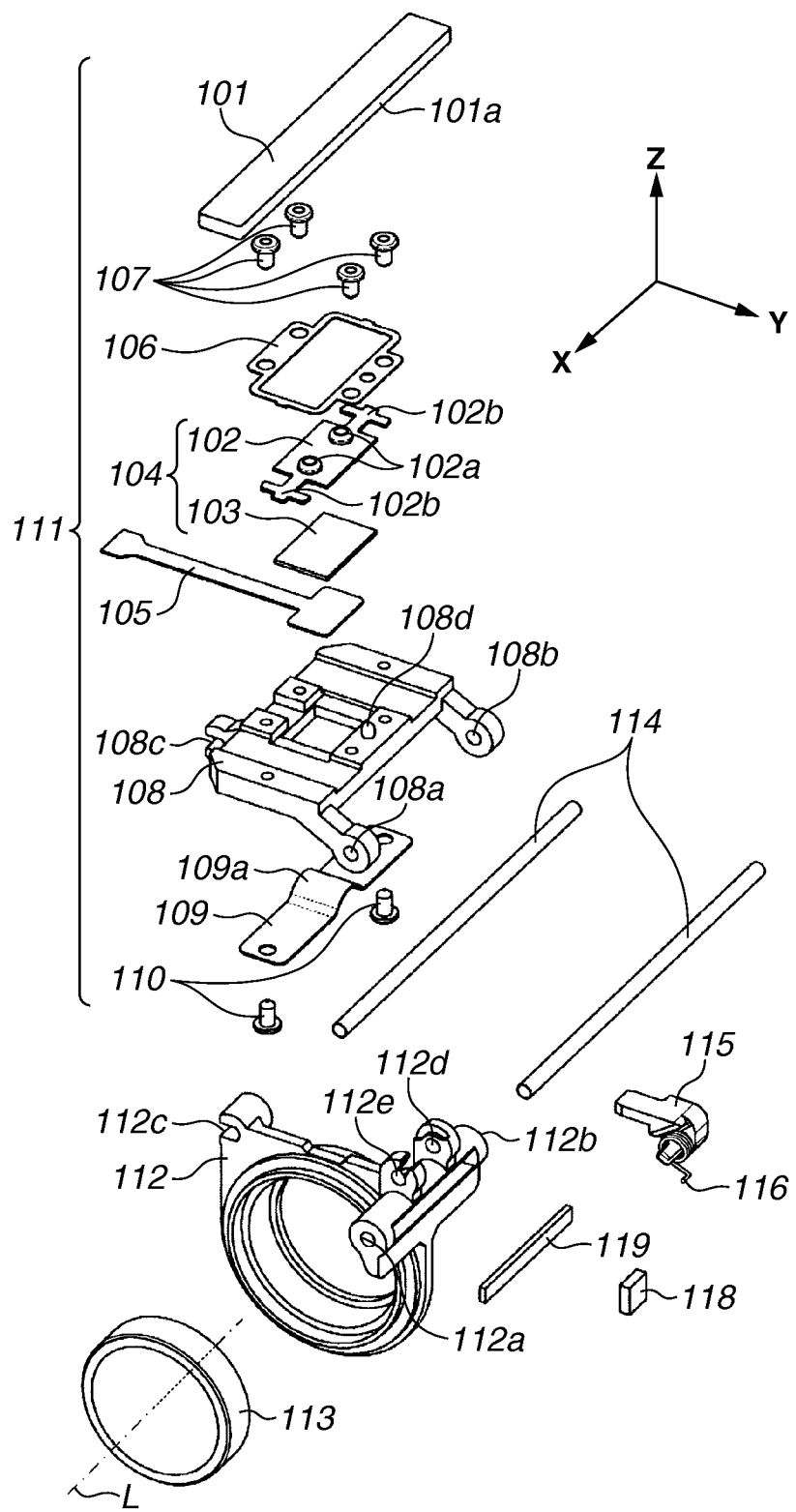
FIG. 1 is an exploded perspective view illustrating respective members of a focus lens portion of a lens barrel device according to an exemplary embodiment of the present invention.
Figure 2:
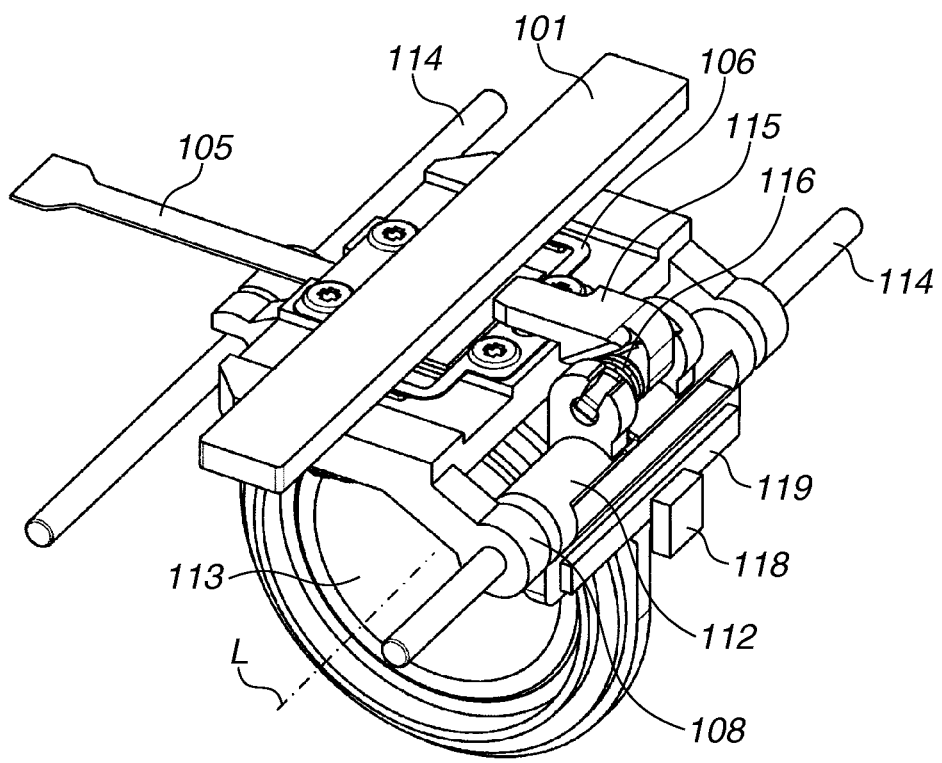
FIG. 2 is a perspective view illustrating a state where the respective members illustrated in FIG. 1 are assembled.

Hereinafter, the present exemplary embodiment will be described with reference to appended drawings. A unitized linear motor serving as an actuator for driving a focus lens of a lens barrel device used for a digital camera will be described as an example of the ultrasonic wave motor according to the present exemplary embodiment although the usage thereof is not limited thereto. FIG. 1 is an exploded perspective view illustrating respective members of a focus lens portion of the lens barrel device according to the present exemplary embodiment. FIG. 2 is a perspective view illustrating a state where the respective members illustrated in FIG. 1 are assembled. In FIGS. 1 and 2, the same reference numerals are applied to the members common to each other. In the present exemplary embodiment, a moving direction of a below-described vibration element 104 is defined as an X axis direction. Further, a pressing direction of a below-described pressing member 109 is defined as a Z axis direction. Furthermore, a direction orthogonal to the X axis direction and the Z axis direction is defined as a Y axis direction.

In FIGS. 1 and 2, a friction member 101 has a contact surface 101a to which the vibration element 104 is pressed to make contact therewith on a backside of one surface illustrated in FIGS. 1 and 2. A vibration plate 102, which is pressed to make contact with the contact surface 101a, includes projections 102a frictionally making contact with the friction member 101 at two positions, and arm portions 102b connected to a below-described thin plate holding member 106 at both ends thereof. A piezoelectric element 103 is pressure-bonded on the vibration plate 102 with an adhesive. The vibration plate 102 and the piezoelectric element 103 configure the vibration element 104. A flexible substrate 105 is electrically connected with an electrode of the piezoelectric element 103 by being pressure-bonded thereto. When a desired voltage is applied to the piezoelectric element 103 via the flexible substrate 105, two ultrasonic wave vibration modes are excited in the piezoelectric element 103, so that elliptic motion occurs in the projections 102a at two positions. At this time, the arm portions 102b are positioned to serve as nodes of the vibration modes in order to prevent unnecessary vibrations from occurring in the thin plate holding member 106. The thin plate holding member 106 is fixed to the vibration plate 102 by welding, so as to hold the vibration element 104. A movable frame 108 holds the vibration element 104 and a pressing member 109 (described below) via the thin plate holding member 106 to serve as an integral part of the vibration element 104. The thin plate holding member 106 is fixed to the movable frame 108 with four screws 107.

The pressing member 109 for pressing the vibration element 104 against the friction member 101 is fixed to the movable frame 108 with two screws 110. The pressing member 109 is formed of a plate spring, so that a convex portion 109a formed at a center of the pressing member 109 makes contact with the vibration element 104 via the flexible substrate 105 when the pressing member 109 is fixed to the movable frame 108 with the screws 110. Then, the pressing member 109 deforms to function as a plate spring, so as to press the vibration element 104 against the friction member 101 in the Z axis direction. At this time, the convex portion 109a of the pressing member 109 makes contact with a region in a vicinity of the nodes of the vibration modes excited in the vibration element 104, so as not to interrupt the vibrations generated in the vibration element 104. A linear type ultrasonic wave motor 111 is configured of the above-described constituent elements 101 to 110, and the movable frame 108 is attached to below-described two guide members 114. Therefore, the ultrasonic wave motor 111 rectilinearly moves in two directions on the guide members 114.

Subsequently, a lens holding member 112 will be described. A lens 113 is fixed to the lens holding member 112, and an optical axis L of the lens 113 is parallel to the X axis. The lens 113 serves as a focus lens of the lens barrel device. The lens holding member 112 adjusts a focal position by rectilinearly moving on the below-described two guide members 114 in the same manner as the ultrasonic wave motor 111. The guide members 114 hold the movable frame 108 and the lens holding member 112 so as to allow them to move rectilinearly. One of the two guide members 114 fits into circular hole portions 108a and 108b of the movable frame 108 whereas the other one fits into a U-shape hole portion 108c of the movable frame 108. Likewise, the one of guide members 114 fits into circular hole portions 112a and 112b of the lens holding member 112 whereas the other one fits into a U-shape hole portion 112c of the lens holding member 112. With the above-described configuration, the movable frame 108 and the lens holding member 112 can rectilinearly move on the guide members 114. As described above, according to the present exemplary embodiment, the guide members 114 serve as the rectilinear guide mechanism of both the lens holding member 112 and the vibration element 104. In the present exemplary embodiment, the guide members 114 serve as the rectilinear guide mechanism of the lens holding member 112 and the vibration element 104 because the vibration element 104 is rectilinearly moved with respect to the fixed friction member 101. However, the guide members 114 may serve as the rectilinear guide mechanism of the lens holding member 112 and the friction member 101 when the above-described relationship between the friction member 101 and the vibration element 104 is interchanged.

A connection member 115 transmits a driving force generated in the ultrasonic wave motor 111 to the lens holding member 112. The connection member 115 is attached to the lens holding member 112 by fitting with a circular hole portion 112d and a U-shape hole portion 112e thereof. Then, a spherical portion provided on a leading end of a shaft portion 108d of the movable frame 108 and a V-shape groove portion of the connection member 115 engage with each other without play, by a rotational force of a torsion coil spring 116 (i.e., urging force in the approximately Z axis direction applied to the connection member 115). The torsion coil spring 116 also functions to press the connection member 115 toward the circular hole portion 112d in the X axis direction, so that the driving force generated in the ultrasonic wave motor 111 can be transmitted to the lens holding member 112 without rattling. With the above-described configuration, the lens holding member 112 can smoothly move in two directions along the two guide members 114 together with the movable frame 108.

A sensor 118 detects a position of the lens holding member 112 on the guide members 114 by reading positional information of a scale 119 attached to a side surface of the lens holding member 112. As described above, these members are assembled to configure the focus lens portion of the lens barrel device.

In addition, in FIG. 2, although it is illustrated as if the friction member 101, the guide members 114, and the sensor 118 are not held by the lens barrel device, the respective members 101, 114, and 118 are actually held by lens barrel members formed to enclose the focus lens portion illustrated in FIG. 2. In the present exemplary embodiment, for the sake of simplicity of the drawings, the lens barrel members are not illustrated in the appended drawings. Then, by applying a desired voltage to the piezoelectric element 103 via the flexible substrate 105 of the above-described ultrasonic wave motor 111, the elliptic motion is caused in the portions of the vibration plate 102 (i.e., projections 102a at two positions) which make contact with the friction member 101. A driving force is generated by the elliptic motion, so that the vibration element 104 (i.e., movable frame 108) rectilinearly moves on the friction member 101 along the guide members 114 in two directions along the X axis. Further, because the movable frame 108 and the lens holding member 112 are fixedly connected to each other in the X axis direction by the connection member 115, the lens holding member 112 also rectilinearly moves on the guide members 114 in the X axis direction. At this time, the ultrasonic wave motor 111 and the lens holding member 112 share and use the two guide members 114 as the guide members for the rectilinear movement. Accordingly, the rectilinear movement of respective members can be realized by the configuration including a smaller number of components at low cost.

In the present exemplary embodiment, the guide members 114 are disposed between moving members such as the movable frame 108 and the lens holding member 112. Therefore, unstable force caused by the moment is less likely to act thereon because the guide members 114 and the moving members such as the movable frame 108 and the lens holding member 112 are disposed adjacent to each other. For this purpose, of the friction member 101 and the vibration element 104 included in the ultrasonic wave motor 111, the vibration element 104 is disposed on a position close to the optical axis L of the lens 113 whereas the friction member 101 is disposed on a position far from the optical axis L of the lens 113. With this configuration, the movable frame 108 can be disposed closer to the guide members 114, so as to be able to make a rectilinear movement stably. Alternatively, the friction member 101 can be connected thereto by the connection member 115 to rectilinearly move in the X axis direction on the guide members 114 together with the lens holding member 112. In such a case, the positions of the pressing member 109 and the friction member 101 are reversed, and, for example, the groove portion of the connection member 115 engages with the shaft portion 108d of the movable frame 108 disposed on the friction member 101 without play.

Further, in the present exemplary embodiment, the driving force of the ultrasonic wave motor 111 is taken out from the shaft portion 108d of the movable frame 108. However, the driving force is actually generated between the projections 102a of the vibration plate 102 at two positions and the contact surface 101a of the friction member 101. Therefore, a take-out position of the driving force is shifted from a generation position of the driving force in the Y axis direction. However, the take-out position and the generation position of the driving force are approximately matched in the Z axis direction, and the priority is placed on such a positional relationship. However, the take-out position may be provided on another portion of the movable frame 108 to prioritize the positional relationship in the Y axis direction.

Further, in general, in the ultrasonic wave motor, a reaction force of the pressure is applied to the rectilinear guide mechanism of the ultrasonic wave motor because the vibration element has to be pressed against the friction member. As a result, friction occurs in the rectilinear guide mechanism, so that a load caused by the friction is imposed on the ultrasonic wave motor during driving. According to the present exemplary embodiment, in order to prevent the friction caused by the reaction force of the pressure from occurring between the lens holding member 112 and the two guide members 114, the movable frame 108 and the lens holding member 112 are connected to each other by employing the above-described configuration. With the above-described configuration, the friction occurring in the lens holding member 112 that has heavier weight can be reduced as much as possible, and thus the rectilinear movement can be performed stably. Accordingly, although the friction caused by the reaction force of the pressure from the pressing member 109 occurs in the region between the movable frame 108 and the two guide members 114, the friction becomes relatively small because the movable frame 108 has a weight lighter than the lens holding member 112 that holds the lens 113. Hereinafter, the details of the present exemplary embodiment will be described.

Figure 3:
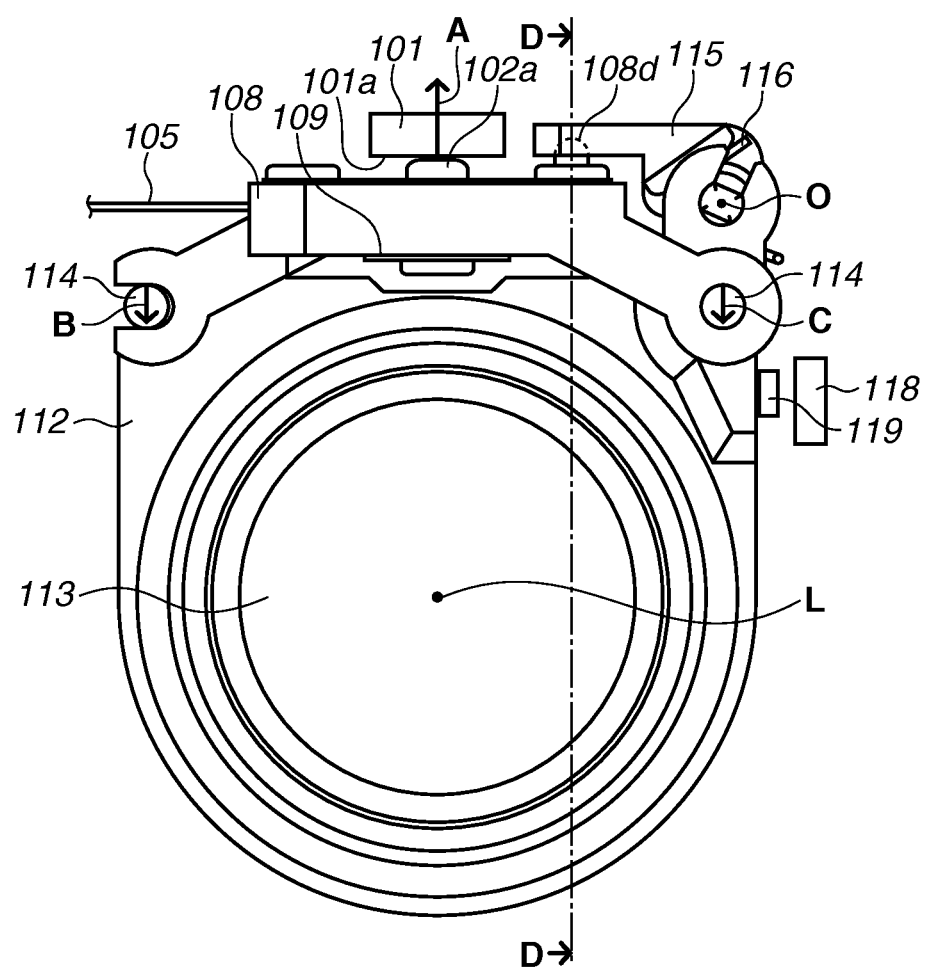
FIG. 3 is a front view seen from a direction of an optical axis, illustrating the respective members illustrated in the perspective view of FIG. 2.

FIG. 3 is a front view seen from a direction of the optical axis L, illustrating the respective members illustrated in the perspective view of FIG. 2. In FIG. 3, the same reference numerals are applied to the members common to those illustrated in FIGS. 1 and 2. Because the vibration element 104 is pressed against the friction member 101 by the pressing member 109, a pressure force A indicated by an arrow A in FIG. 3 acts on between the projections 102a of the vibration plate 102 and the contact surface 101a of the friction member 101. At this time, a reaction force of the pressure force A is generated because the friction member 101 is held by the lens barrel members (not illustrated). This reaction force is generated between the movable frame 108 and the two guide members 114 as indicated by arrows B and C in FIG. 3. In addition, the reaction force C is generated in two positions in a depth direction of FIG. 3 although the reaction force C is illustrated in only one position in FIG. 3. Then, the friction force caused by the reaction forces B and C is generated between the movable frame 108 and the guide members 114. This friction force becomes a load of the ultrasonic wave motor 111. Further, the friction force can be reduced to a certain extent by applying lubricating oil between the movable frame 108 and the guide members 114. In addition, the friction force can be further reduced by employing a rolling motion mechanism using a ball or a roller. However, in the present exemplary embodiment, a sliding motion mechanism using a shaft and a hole in a low-priced simple configuration is employed.

Subsequently, a mechanism for transmitting the driving force of the ultrasonic wave motor 111 to the lens holding member 112 will be described. As described above with reference to FIGS. 1 and 2, the connection member 115 is attached to the lens holding member 112 in a rotatable state while being biased in a counterclockwise direction around a point O in FIG. 3, so as to engage with the spherical leading end portion, which is expressed by a dotted line in FIG. 3, of the shaft portion 108d of the movable frame 108. The engagement of the shaft portion and the groove portion or the hole portion may be reversed, and thus the groove portion or the hole portion may be provided on the movable frame 108 whereas the shaft portion may be provided on the connection member 115. The groove portion and the shaft portion can be formed in various shapes, radiuses, depths, and heights. The groove portion and the shaft portion can be configured in various ways as long as the connection member is biased to cause a bottom of the groove portion (or a material portion around the hole portion) to make contact with a top of the shaft portion (or a base portion around the shaft portion).

Figure 4:
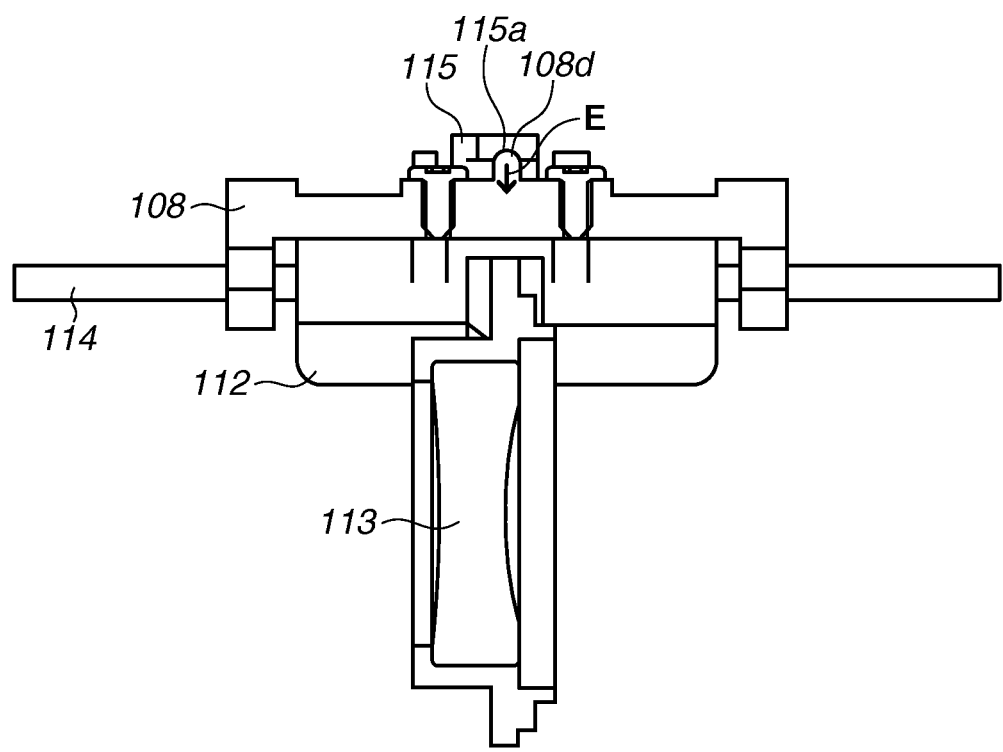
FIG. 4 is a cross-sectional view illustrating an engaged state of a connection member and a shaft portion.

FIG. 4 is a cross-sectional view taken along a line D-D in FIG. 3, illustrating an engaged state of the groove portion of the connection member 115 and the shaft portion 108d of the movable frame 108. In FIG. 4, a V-shape groove portion 115a of the connection member 115 and the spherical portion formed at the leading end of the shaft portion 108d engage with each other without play. In the above-described configuration, a force E indicated by an arrow E in FIG. 4 acts on the V-shape groove portion 115a of the connection member 115 caused by the rotational force of the torsion coil spring 116 attached to the connection member 115. At this time, because the reaction force is also generated against the force E, friction occurs between the lens holding member 112 and the two guide members 114. However, the friction occurring therebetween is extremely small because the force E is significantly small in comparison to the pressure force A. Accordingly, it can be assumed that only the friction force caused by own weights of the lens holding member 112 and the lens 113 acts on between the lens holding member 112 and the two guide members 114, and thus the lens holding member 112 and the guide members 114 are less likely to be influenced by the reaction force of the pressure force A. Therefore, the above-described configuration enables the reaction force with respect to the lens holding member 112 caused by the pressing member 109 of the ultrasonic wave motor 111 to be relieved. In addition, although the force E is also applied to the reaction forces B and C in the regions between the movable frame 108 and the two guide members 114, it does not have to be taken into consideration because the force E is significantly small in comparison to the pressure force A.

With the above-described configuration, the driving force generated in the ultrasonic wave motor 111 can be transmitted to the holding member such as the lens holding member 112 without play. The preferred exemplary embodiment according to the present invention has been described as the above. However, the present invention is not limited to the above exemplary embodiment, and many variations and modifications are possible within the scope of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-005153 filed Jan. 15, 2014, which is hereby incorporated by reference herein in its entirety.

What is claimed is:

1. A driving device including a vibration element, a friction member, and a pressing member for applying pressure in a direction in which the vibration element and the friction member make contact with each other, causing the vibration element and the friction member to make a relative movement by vibration generated in the vibration element, the driving device comprising:
   a connection member configured to transmit a driving force caused by the relative movement to a holding member of another member, wherein the holding member makes a movement caused by the transmitted driving force; and
   a guide member configured to guide the holding member in a moving direction when the vibration element and the friction member make the relative movement,
   wherein the connection member connects the holding member to the vibration element or the friction member so as not to apply a reaction force caused by the pressing member to the holding member.

2. The driving device according to claim 1,
   wherein the guide member guides the holding member and the vibration element or the friction member.

3. The driving device according to claim 1,
   wherein the holding member for the another member is a lens holding member.

4. The driving device according to claim 1,
   wherein the vibration element is moved with respect to the friction member that is fixed.

5. The driving device according to claim 4,
   wherein a groove portion of the connection member engages with a shaft portion provided as an integral part of the vibration element by being biased in a direction of the reaction force to connect the holding member and the vibration element.

6. The driving device according to claim 1,
   wherein the vibration generated in the vibration element is an ultrasonic wave vibration.

7. The driving device according to claim 1,
   wherein the relative movement of the vibration element and the friction member is a rectilinear movement.

8. The driving device according to claim 1,
   wherein the movement of the holding member caused by the transmitted driving force is a rectilinear movement, and the guide member guides the rectilinear movement.

9. A lens holding device including an actuator having a vibration element, a friction member, and a pressing member for pressing the vibration element against the friction member, the actuator causing the vibration element and the friction member to move relatively by a vibration generated in the vibration element, and the lens holding device being used as a rectilinear guide mechanism when the vibration element and the friction member relatively make a rectilinear movement, the lens holding device comprising:
   a lens holding member configured to hold a lens;
   a guide member configured to guide a movement of the lens holding member; and
   a movable frame configured to hold the vibration element and the pressing member, and to hold the guide member separately from the lens holding member.

10. The lens holding device according to claim 9,
    wherein the guide member guides movements of the lens holding member and the movable frame.

11. The lens holding device according to claim 9, further comprising a connection member configured to transmit, when the movable frame moves along the guide member with respect to the friction member, a driving force caused by the movement of the movable frame to the lens holding member,
    wherein, in order to connect the lens holding member and the movable frame so as not to apply a reaction force caused by the pressing member to the lens holding member, the connection member connects the lens holding member and the movable frame by making a groove portion of the connection member be biased in a direction of the reaction force to engage with a shaft portion of the movable frame.

12. The lens holding device according to claim 9,
    wherein the vibration generated in the vibration element is an ultrasonic wave vibration.

13. The lens holding device according to claim 9,
    wherein the relative movement of the vibration element and the friction member is a rectilinear movement.

14. The lens holding device according to claim 9,
    wherein the movement of the lens holding member caused by the transmitted driving force is a rectilinear movement, and the guide member guides the rectilinear movement.

15. A driving unit-equipped device comprising:
    a driving unit including a vibration element, a friction member, and a pressing member for pressing the vibration element against the friction member, and configured to cause the vibration element and the friction element to move relatively by a vibration generated in the vibration element;
    a guide member configured to guide a movement of a holding member for another member; and
    a connection member configured to transmit a driving force caused by the relative movement of the vibration element and the friction member of the driving unit to the holding member,
    wherein the connection member is disposed in a rotatable state by being biased in a direction perpendicular to a direction of the movement, and the connection member and the driving unit engage with each other by a spherical leading end portion and a groove portion or a hole portion.

16. The driving unit-equipped device according to claim 15,
wherein the holding member for the another member is a lens holding member configured as a lens barrel device.

17. The driving unit-equipped device according to claim 15,
wherein the guide member guides a movement of the holding member and the vibration element or the friction member.

18. The driving unit-equipped device according to claim 15,
wherein the vibration element is moved with respect to the fixed friction member.

19. The driving unit-equipped device according to claim 18,
wherein, of the vibration element and the friction member, the vibration element is disposed on a side close to the holding member.

20. The driving unit-equipped device according to claim 18,
wherein a groove portion formed on the connection member engages with a shaft portion provided as an integral part of the vibration element by being biased in a direction of the reaction force to connect the holding member and the vibration element.

21. The driving unit-equipped device according to claim 15,
wherein the vibration generated in the vibration element is an ultrasonic wave vibration.

22. The driving unit-equipped device according to claim 15,
wherein the relative movement of the vibration element and the friction member is a rectilinear movement.

23. The driving unit-equipped device according to claim 15,
wherein the movement of the holding member caused by the transmitted driving force is a rectilinear movement, and the guide member guides the rectilinear movement.

24. The driving unit-equipped device according to claim 15,
wherein the connection member is provided with the spherical leading end portion whereas the driving unit is provided with the groove portion or the hole portion.

25. The driving unit-equipped device according to claim 15,
wherein the driving unit is provided with the spherical leading end portion whereas the connection member is provided with the groove portion or the hole portion.

* * * * *